(12) United States Patent
Nagel et al.

(10) Patent No.: US 8,570,501 B2
(45) Date of Patent: *Oct. 29, 2013

(54) FIBER IDENTIFICATION USING MODE FIELD DIAMETER PROFILE

(75) Inventors: Jonathan Nagel, Brooklyn, NY (US); Sheryl Woodward, Holmdel, NJ (US)

(73) Assignee: AT&T Intellectual Property I, LP., Atlanta, GA (US)

( * ) Notice: Subject to any disclaimer, the term of this patent is extended or adjusted under 35 U.S.C. 154(b) by 973 days.

This patent is subject to a terminal disclaimer.

(21) Appl. No.: 12/640,512

(22) Filed: Dec. 17, 2009

(65) Prior Publication Data

US 2011/0153544 A1 Jun. 23, 2011

(51) Int. Cl.
*G01N 21/00* (2006.01)

(52) U.S. Cl.
USPC ......................................... 356/73.1

(58) Field of Classification Search
USPC ......................................... 356/73.1
See application file for complete search history.

(56) References Cited

U.S. PATENT DOCUMENTS 5,995,212 A * 11/1999 Dar et al. ...................... 356/73.1
7,199,869 B2 * 4/2007 MacDougall ................ 356/73.1
2009/0268197 A1 * 10/2009 Perron et al. ................. 356/73.1

OTHER PUBLICATIONS

Hartog, et al., "On the Theory of Backscattering in Single-Mode Optical Fibers", Journal of LightWave Technology, vol. LT-2, No. 2, Apr. 1984, pp. 76-82.
Nakazawa et al., "Measurement and Analysis on Polarization Properties of Backward Rayleigh Scattering for Single-Mode Optical Fibers", IEEE Journal of Quantum Electronics. vol. QE-17, No. 12, Dec. 1981, pp. 2326-2334.
Gold et al., "Determination of Structural Parameter Variations in Single-Mode Optical Fibres by Time-Domain Reflectometry", Electronic Letters, Jun. 10, 1982, vol. 18, No. 12, pp. 489-490.
Luna Technologies, Luna OFDR Data Sheet, Optical Frequency Domain Reflectometer, pp. 1-12, Rev. 07/04.

* cited by examiner

*Primary Examiner* — Tara S Pajoohi Gomez
(74) *Attorney, Agent, or Firm* — Fay Kaplun & Marcin, LLP

(57) ABSTRACT

Described herein are systems and methods for uniquely identifying, or "fingerprinting," optical fibers based upon measurements from an optical time-domain reflectometer ("OTDR"). One embodiment of the disclosure of this application is related to a computer readable storage medium including a set of instructions that are executable by a processor. The set of instructions being operable to retrieve a profile for an intended fiber, the profile including unique measurement data of the intended fiber, collect further measurement data from a connected fiber within a network, compare the unique measurement data of the intended fiber to the further measurement data of the connected fiber, and confirm an identity of the connected fiber as being the intended fiber when the unique measurement data matches the further measurement data, and trigger an alert when the unique measurement data does not match the further measurement data.

20 Claims, 3 Drawing Sheets

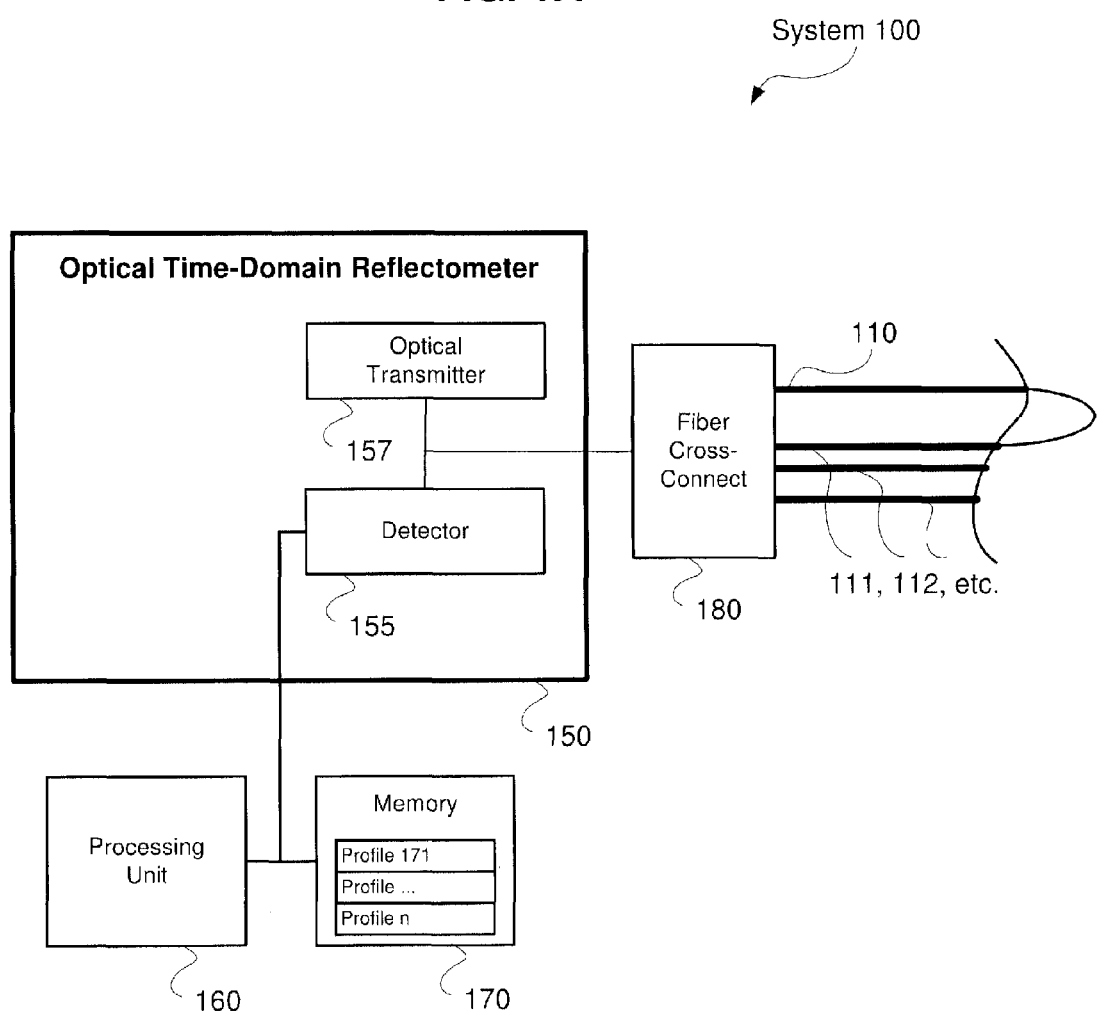

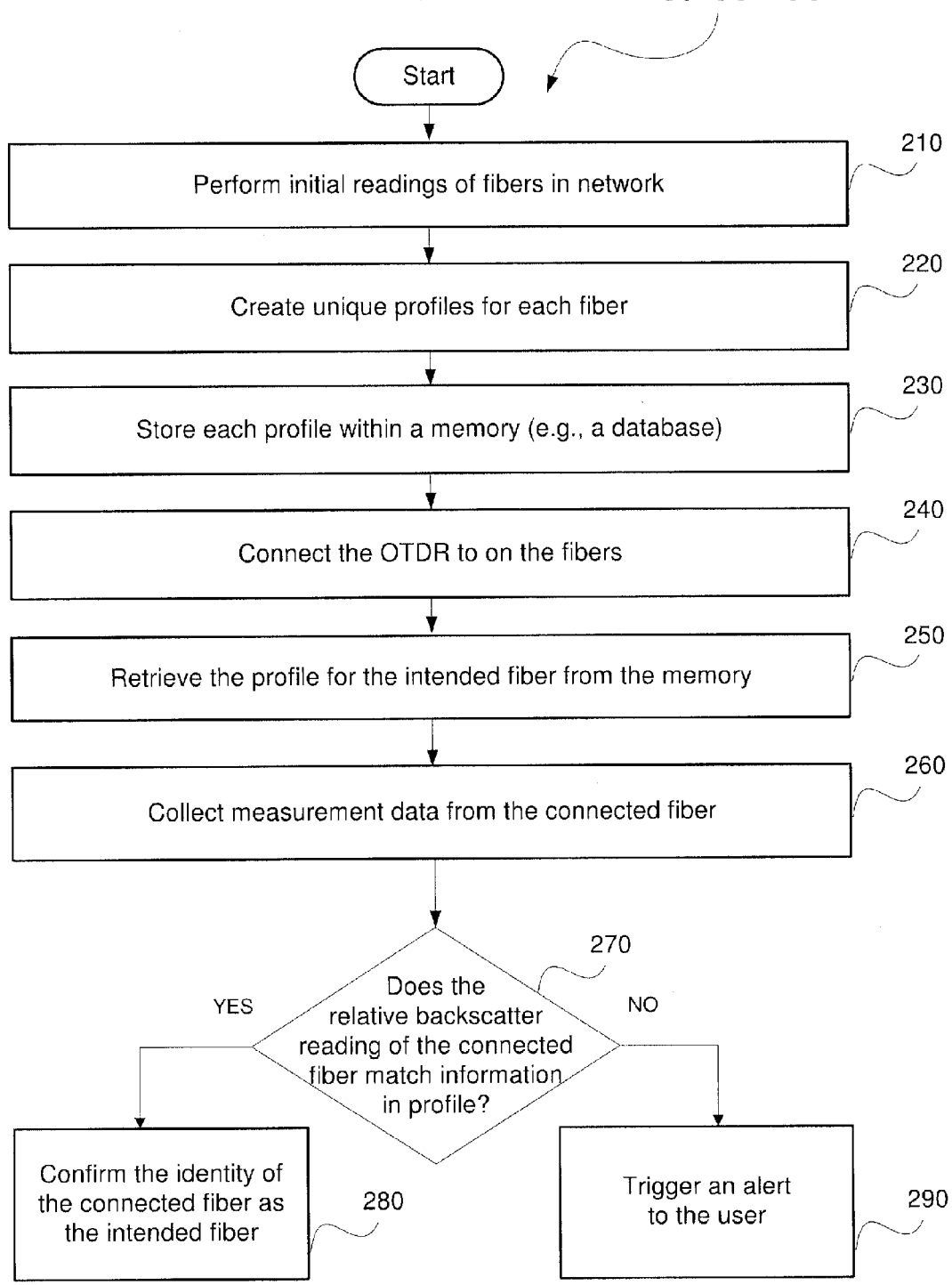

FIBER IDENTIFICATION USING MODE FIELD DIAMETER PROFILE

BACKGROUND

An optical time-domain reflectometer ("OTDR") is an opto-electronic instrument used to characterize an optical fiber. A typical OTDR injects a series of optical pulses into the fiber during a testing process. From the same end of the fiber, the OTDR also extracts light that is scattered and reflected back from points in the fiber due to irregularities in the optical fiber structure. This process is equivalent to the manner in which an electronic time-domain reflectometer may measure reflections caused by changes in the impedance of the cable under test. Accordingly, the strength of the back-reflected light is measured and integrated as a function of time, and is plotted as a function of fiber length.

OTDRs have conventionally been standard equipment for the characterization of optical fiber. Specifically, it is well known that by transmitting a pulse down a fiber and analyzing the back-reflected light, the loss of the fiber may then be characterized. OTDRs may characterize the loss and length of an examined fiber during manufacture, during warehousing, during installation, and during splicing. OTDRs are also used in measuring optical return loss in the fiber, as well as locating faults in the fiber, such as breaks. Faults or failures in the fiber may be costly, in terms of repairing the fiber, as well as any adverse affects in service (e.g., disruption or loss of service). However, conventional identification and verification of specific fibers within a network are prone to human error.

SUMMARY OF THE INVENTION

Described herein are systems and methods for uniquely identifying, or "fingerprinting," optical fibers based upon measurements from an optical time-domain reflectometer ("OTDR"). One embodiment of the disclosure of this application is related to a computer readable storage medium including a set of instructions that are executable by a processor. The set of instructions being operable to retrieve a profile for an intended fiber, the profile including unique measurement data of the intended fiber, collect further measurement data from a connected fiber within a network, compare the unique measurement data of the intended fiber to the further measurement data of the connected fiber, and confirm an identity of the connected fiber as being the intended fiber when the unique measurement data matches the further measurement data, and trigger an alert when the unique measurement data does not match the further measurement data.

A further embodiment of the disclosure of this application is related to a system comprising a memory storing profiles of a plurality of fibers within a network, each profile including unique measurement data pertaining to one of the plurality of fibers, a detector collecting further measurement data from a connected fiber, and a comparator comparing the further measurement data to the unique measurement data of the profiles, the comparator confirming an identity of the connected fiber as one of the plurality of fiber when the further measurement data match unique measurement data of one of the profiles, and the comparator triggering an alert when the further measurement data does not match unique measurement data of any of the profiles.

BRIEF DESCRIPTION OF THE DRAWINGS

FIG. 1A shows an exemplary system for identifying an optical fiber using bi-directional analysis techniques according to the embodiments described herein.

FIG. 2 shows an exemplary method for identifying an optical fiber using bi-directional analysis techniques according to the embodiments described herein.

DETAILED DESCRIPTION

Figure 1B:
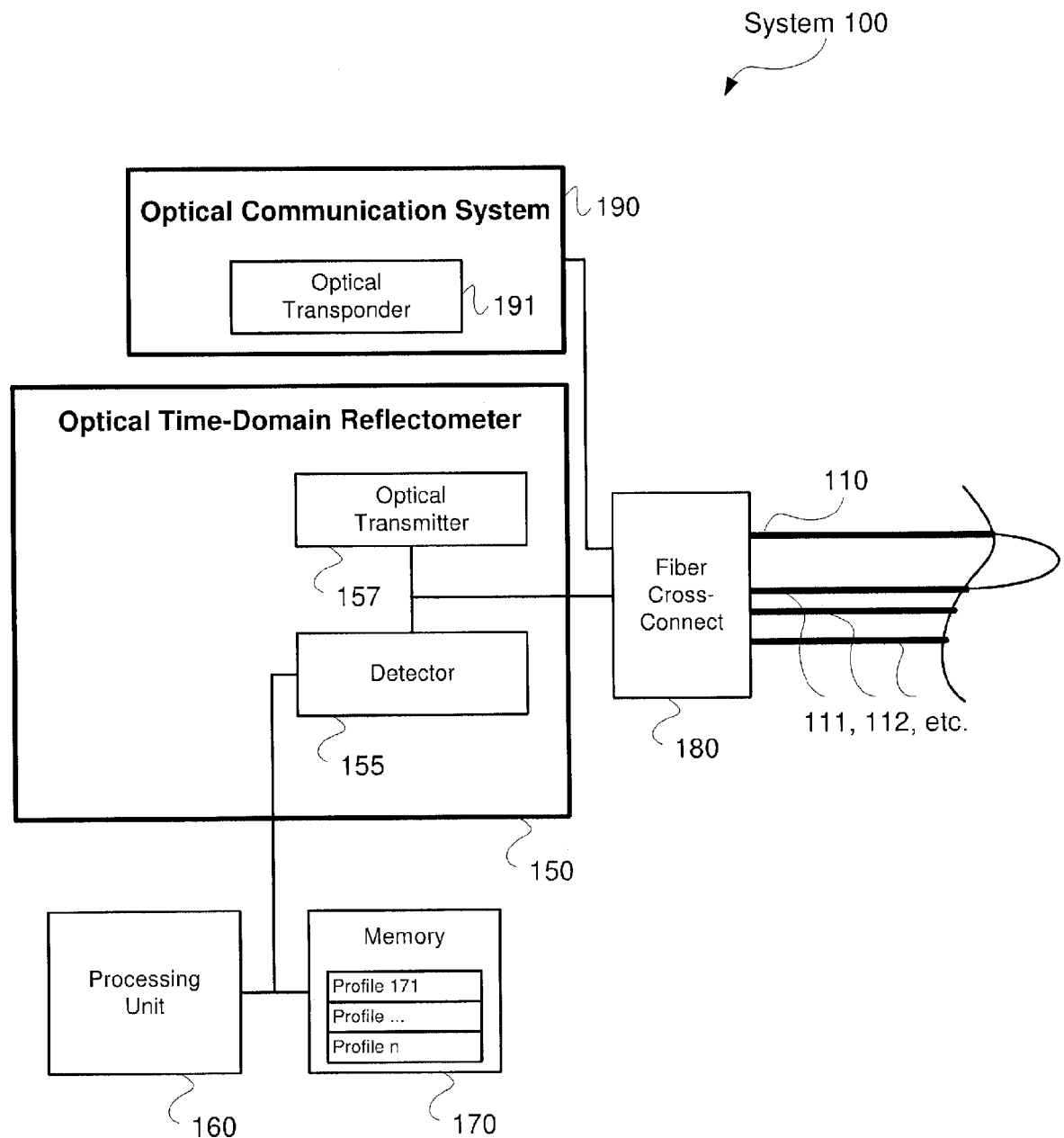
FIG. 1B shows an alternative system for identifying an optical fiber using bi-directional analysis techniques according to the embodiments described herein.

The exemplary embodiments may be further understood with reference to the following description and the related appended drawings, wherein like elements are provided with the same reference numerals. The exemplary embodiments are related to systems and methods for uniquely identifying, or "fingerprinting," optical fibers based upon measurements from an optical time-domain reflectometer ("OTDR"). These measurements may include various characteristics of the tested fiber, such as the relative backscatter, which may be described as a measure of the variation in the mode field diameter ("MFD") of the fiber. It should be noted that within the field of fiber optics, a MFD reading may be defined as an expression of distribution of the irradiance, or the optical power per unit area, across an end face of a tested fiber.

Conventional identification of a particular fiber within a network office has been accomplished by tracing fiber jumpers. Furthermore, these conventional methods may typically require the use of these trace jumpers through a remote location, such as a remote central office. To identify individual fibers within a cable, which is necessary when repairing cable cuts between offices, technicians must rely on color-coding on the individual fibers. However these techniques have led to manual errors in fiber maintenance and network operations. In contrast to the conventional methods, the exemplary system and methods described herein verify the identity of a deployed fiber through making measurements, such as MFD readings (e.g., relative backscatter measurements), along the length of the fiber. This may prove valuable in optical networking, especially if OTDRs are integrated into transmission equipment.

Accordingly, exemplary system and methods provide a more effective manner for allowing a user (e.g., field technician) to verify that the user is connected to an intended fiber when performing fiber characterizations. Specifically, if a technician inadvertently connects to any fiber other than the intended target fiber, the analysis of the data collected by the exemplary systems and methods may automatically identify, alert and report such an error. In other words, if a mistake is made during the testing of a particular fiber, such as the OTDR traces being measured on another fiber, then the analysis of MFD measurements may yield discrepancies. Accordingly, an alert may be produced to flag the fiber, or otherwise indicate that a mistake has been made.

FIG. 1A shows an exemplary system 100 for identifying an optical fiber 110 using bi-directional analysis techniques according to the embodiments described herein. The exemplary system 100 may include an OTDR 150 in communication with a processing unit 160 (e.g., a processor, multiprocessor, CPU, a comparator, etc.) and a centralized data location, such as memory 170 (e.g., a sortable database). It should be noted that the processing unit 160 may perform a set of instructions related to the systems and methods described herein. Furthermore, the processing unit 160 may be in communication with a computer-readable storage medium, such as the memory 170, or any other form of computer memory. Accordingly, each of the OTDR 150, the processing unit 160, and the memory 170 may be composed of various computer hardware or software components, or any combination thereof.

By analyzing bi-directional traces (e.g., two OTDR traces taken from each end of an optical fiber) one may more accurately calculate the loss and relative backscatter function along the length of the fiber, by what is calculated using a single trace. The relative backscatter function is a function of various characteristics of a fiber such as, but not limited to, the fiber's mode field diameter, doping concentration, Rayleigh scatter coefficient, core diameter, etc. The dominant cause of variation in the relative backscatter function is due to variations in the mode-field diameter. The relative backscatter function (η) can be calculated from the two traces using the following equation:

$$\eta(x) = (10 \cdot \log_{10} T_{back} + 10 \cdot \log_{10} T_{forward})/2$$

wherein $T_{back}$ and $T_{forward}$ may be the forward and back OTDR traces in linear units. It should be noted that the two traces $T_{back}$ and $T_{forward}$ vary along the length of the fiber, and in the above equation the measurements must be aligned, so that the measurements $T_{back}$ and $T_{forward}$ correspond to the same points along the axis to insure accurate results.

As will be described below, the processing unit 160 may identify the fiber 110 by comparing measurements from the OTDR 150 to information stored within the memory 170. In addition to the fiber 110, further fibers 111, 112, etc. may be connected to the OTDR 150 for analytical testing and accurate identification. According to the exemplary embodiments of the system 100, bi-directional measurements may be made from one location by connecting two of the fibers (e.g., looping fiber 110 back with fiber 111). While not illustrated in FIG. 1A, alternatively, measurements may be made on both ends of the fiber under test 110.

It should be noted that each of the processing unit 160 and the memory 170 may reside within the OTDR 150, itself. Alternatively, these components may reside in separate devices in communication with the OTDR 150. Furthermore, it should be noted that the system 100 is not limited to a particular set of components, and may include any number of components, either more or less than those illustrated in FIG. 1A.

The exemplary OTDR 150 may be used for estimating the length of the fiber 110 and overall attenuation, including splice losses and connector losses. Specifically, the OTDR 150 may include a detector 155 for measuring and testing the fiber 110 by recording the optical power in the backreflected light as a function of time, and mapping the time delay into the corresponding distance along the fiber length. From a single OTDR trace, a user may see the level of back-reflected light as a function of distance down the fiber 110. The signal level is a function of both the fiber loss and the relative backscatter of the fiber 110.

Accordingly, the exemplary OTDR 150 described herein may perform analytical measurements from each end of the tested optical fiber 110 (e.g., bi-directional OTDR measurements). Bi-directional traces may more accurately calculate the loss and relative backscatter along the length of the fiber then what is calculated using a single trace. Specifically, bi-directional analyses may also be used to characterize local variations in both the structure and loss along the length of the fiber 110. Analysis of these traces proves both the loss and relative backscatter along the length of the fiber 110. Thus, OTDR traces may be taken from each end of the fiber 110 using a bi-directional analysis in order to accurately measure fiber characteristics such as MFD (e.g., relative backscatter).

It is important to note that the MFD of this particular fiber 110 will vary from any other fibers (e.g., 111, 112, etc.) due to small variations during the manufacturing process. Furthermore, it should be noted that the MFD of this particular fiber 110, or any other fiber, would not change with the age of the fiber, or with environmental changes around the fiber (e.g., temperature/humidity changes, etc.). In other words, the MFD of the optical fiber 110 may be specific to only that one fiber 110 and may not change over the lifetime of the fiber 110. This is in contrast to the loss along optical fiber 110, which may vary over time, for example, temperature-dependent stress in the cable may cause the loss to vary seasonally.

According to the exemplary embodiments, the system 100 may provide a method for identifying, or fingerprinting, the optical fiber 110. As will be described in an exemplary method below, the OTDR 150 may perform bi-directional measurements of the fiber 110 in order to calculate the relative backscatter of the fiber 110. The centralized storage location, such as memory 170 may collect the relative backscatter data for each fiber that is analyzed. For instance, the memory 170 may create unique entries or profiles for each of the measured fibers (e.g., entry 171 may represent the MFD readings for the tested fiber 110). Accordingly, each of the entries may include at least one identifier (e.g., name, location, ID number, etc.) for a specific fiber as well as its corresponding measurement data, such as the relative backscatter reading.

As subsequent measurements are performed by the OTDR 150 on the additional fibers 111, 112, etc., the MFD data of these subsequent measurements may be compared to the data within the memory 170. Specifically, the processing unit 160 may perform the comparisons and determine if the relative backscatter reading matches the intended unique entry within the memory 170. For example, if a technician planned on identifying the fiber 110, the technician may obtain a relative backscatter reading of the fiber 110 using the OTDR 150. This reading may then be compared to the entry 171 within the memory 170. The processing unit 160 may verify whether the current reading matches the information within the entry 171. If the reading does not match, the technician may then be informed that the fiber being examined by the OTDR 150 is not the intended fiber 110. If the reading does match, the technician may be assured that the OTDR 150 is connected the appropriate fiber 110.

According to an exemplary embodiment of the system 100, the OTDR 150 may be connected to the fibers 110, 111, etc via a fiber cross-connect 180. The fiber cross-connect 180 may connect or disconnect OTDR 150 to any one of the fibers 110, 111, etc. Alternatively, the fiber cross connect 180 may also be connected to an optical communication system 190 which includes optical transponders 191 (See FIG. 1B). The OTDR 150 may be used to verify that the equipment (e.g., the fiber cross-connect 180) is connected to the proper fibers. This may be valuable to verify that optical communication systems are connected to the correct fibers or in dynamic optical networks, wherein the optical communication systems may be switched to different fibers as network demands change, or in response to equipment outages. Furthermore, the OTDR 150 and fiber cross-connect 180 may be used within the recovery process of cable cuts. Specifically, the OTDR 150 may be used to verify that a particular set of fibers have been spliced back together properly by using fiber cross-connect 180 to sequentially connect OTDR 150 to fibers 110, 111, etc. for testing.

As illustrated in FIG. 1B, it is possible to integrate an OTDR 150 into the optical transponder 191 within an optical communication system 190, so that the OTDR 150 is part of an optical transceiver that has two modes of operation. In one mode it transmits and receives information from another optical transceiver located elsewhere in the network. In a second mode of operation, the OTDR 150 may be reconfigured so its internal optical source emits pulses, and the internal optical detector 155 measures the power backreflected from the fiber.

If two fibers 110 and 111 have the same terminal locations, then it is possible to take bidirectional traces from a single location. Specifically, this may be accomplished by connecting the far end of fibers 110 and 111 together, and connecting OTDR 150 to fiber 110, taking a trace, and then connecting OTDR 150 to fiber 111 and taking another trace. Accordingly, the relative backscatter of both fibers 110 and 111 can be calculated from these traces.

FIG. 2 shows an exemplary method 200 for identifying an optical fiber 110 using bi-directional analysis techniques according to the embodiments described herein. The method 200 will be described with reference to the system 100 and the components illustrated in FIG. 1. Furthermore, the steps 210-230 of the method 200 are directed toward an initial set-up phase of the exemplary memory 170. The remaining steps 240-290 are directed towards the identification and verification of the tested optical fiber 110.

In step 210 of the method 200, the OTDR 150 may perform initial readings on any number of fibers within the optical fiber network. Specifically, as noted above, the OTDR 150 may perform traces from each end of the connected fiber to obtain fiber characteristics, such as the relative backscatter along the length of the connected fiber.

In step 220 of the method 200, the OTDR 150 may create unique profiles for each of the fibers read in step 210. These unique profiles may include at least an identifier of the specific fiber, as well as a measurable characteristic of the fiber, such as the relative backscatter readings of each fiber. In other words, each of the profiles may act as a unique "fingerprint" for each of the measured fibers within the network.

In step 230 of the method 200, the processing unit 160 may store each of these profiles within the memory 170 in order to create a reference or legend for comparing future fiber readings to existing fiber profiles. Since the readings between any two fibers are distinct and since the relative backscatter readings for a particular fiber do not change over time, these unique profiles may provide a permanent identifier for each every fiber of the network.

Once the memory 170 has been created, the method 200 may advance to the remaining steps 240-290. However, it should be noted that the memory 170 may be continuously updated as new fibers are added to the optical fiber network and as fibers are removed from the network. Thus, these initial steps 210-230 may be performed at any time.

In step 240 of the method 200, the OTDR 150 may be connected to the one of the fibers. For instance, a user may wish to perform analytical testing on a specific fiber 110. However, due to the number of fibers throughout the network, the user may be unsure of which of the fibers is the intended fiber 110. In other words, the user wants to confirm that the connected fiber is, in fact, the intended fiber 110.

In step 250 of the method 200, the processing unit 160 may retrieve the profile 171 of the intended fiber 110 from the memory 170. As noted above, this profile 171 may be referenced by a unique identifier, such as a name, location, ID/product number, of the intended fiber 110. This profile 171 may also include measurable characteristics of the intended fiber 110, such as the relative backscatter reading.

In step 260 of the method 200, the OTDR 150 may collect measurement data from the connected fiber. Similar to the initial step 210, this measurement data may include relative backscatter readings from the connected fiber. Accordingly, the OTDR 150 calculates the relative backscatter along the length of the connected fiber by performing OTDR traces from each end of the fiber, e.g., bi-directionally. It should be noted that certain steps within the exemplary method 200 may be performed in any particular order. In other words, the steps of the method 200 are not required to be performed in the order illustrated in FIG. 2. For example, step 260 may be performed before step 250, or step 260 may be performed simultaneously with step 250.

In step 270 of the method 200, the processing unit 160 may compare the relative backscatter reading from the profile 171 of step 250 to the OTDR 150 measurement of step 260. This comparison will allow the processing unit 160 to determine whether these readings match. If the relative backscatter reading of the connected fiber matches the relative backscatter of the profile 171 for the intended fiber 110, the method 200 may advance to step 280. If the reading of the connected fiber does not match that of the profile 171 for the intended fiber 110, the method 200 may advance to step 290.

In step 280 of the method 200, the processing unit 160 may confirm the identity of the connected fiber as being the intended fiber 110. Accordingly, the user may be assured that he is connected to the appropriate fiber and may perform any further characterizations and operations needed on this intended fiber 110. Alternatively, the confirmation may be sent electronically to a user, such as a network controller. Such a controller may reconfigure a fiber cross-connect so that this fiber 110 may be connected to the appropriate optical communications equipment.

In step 290 of the method 200, the processing unit 160 may trigger an alert to the user that the connected fiber is not the intended fiber 110. This alert may be transmitted to the user via a visual and/or audio cue. Furthermore, this alert may be transmitted to the user via a display on the OTDR 150. This alert may also be sent electronically to a network controller. Such a controller may then reconfigure a fiber cross-connect so that other fibers can be tested. Accordingly, the user and network may be quickly informed of this connection mistake and may correct this mistake with appropriate actions (e.g., review the layout of the fiber network, connect to another fiber, obtain a reading on this other fiber, etc.).

According to an alternative method, the user may simply use the OTDR 150 to quickly identify a plurality of fibers within the optical fiber network. As opposed to verifying whether a single connected fiber is the intended fiber 110, the user may wish to efficiently identify several fibers. Once the memory 170 has been created, the user may perform several OTDR traces on a group to obtain MFD readings for each of the fibers. As the data is collected individually for each fiber, these relative backscatter readings may be compared to the profiles within the memory 170. Each profile match may allow the user to accurate identify a particular fiber within the group. Therefore, this alternative method may allow the user manage the plurality of fibers, such as physically labeling and inventorying each of the identified fibers for future reference.

The exemplary systems and methods described above may aid in inventory control, as it would allow for users to track and correlated all data on numerous fibers in a network during the lifespan of each fiber (e.g., from the initial fiber implementation into the network to the removal of the fiber from the network). Furthermore, these systems and methods may be used to verify that fibers have not been modified. Accordingly, this may aid in network operations. Specifically, too many modifications on a particular fiber may force operations to make modifications to the transmission equipment, such as changing the dispersion compensating module used in the network. However, having an inventory system capable of tracking these changes over time would be beneficial. A further application would be to verify whether or not the tested fibers have been tampered with. Accordingly, this may provide added security benefits to managing and monitoring the optical fiber network.

It will be apparent to those skilled in the art that various modifications may be made in the described embodiments, without departing from the spirit or the scope of the application. Thus, it is intended that the present disclosure covers modifications and variations of this application provided they come within the scope of the appended claimed and their equivalents.

What is claimed is:

1. A tangible computer readable storage medium including a set of instructions that are executable by a processor, the set of instructions, when executed by the processor, causing the processor to perform operations comprising:
   retrieving a profile for an intended fiber, the profile including unique measurement data of the intended fiber;
   collecting further measurement data from a connected fiber within a network;
   comparing the unique measurement data of the intended fiber to the further measurement data of the connected fiber; and
   confirming an identity of the connected fiber as being the intended fiber when the unique measurement data matches the further measurement data, and triggering an alert when the unique measurement data does not match the further measurement data.

2. The tangible computer readable storage medium according to claim 1, wherein the operations further comprise:
   performing initial measurements of a plurality of fibers in the network, the plurality of fibers including the intended fiber;
   creating a plurality of profiles for each of the plurality of fibers, each of the profiles including unique measurement data for each of the fibers; and
   storing the plurality of profiles.

3. The tangible computer readable storage medium according to claim 1, wherein the unique measurement data includes a relative backscatter reading of the intended fiber and the further measurement includes a relative backscatter reading of the connected fiber.

4. The tangible computer readable storage medium according to claim 1, wherein the collecting of the further measurement data is performed by an optical time-domain reflectometer.

5. The tangible computer readable storage medium according to claim 1, wherein the collecting of the further measurement data includes bi-directional traces along the length of the connected fiber.

6. The tangible computer readable storage medium according to claim 1, wherein the comparing the unique measurement data of the intended fiber to the further measurement data of the connected fiber is performed by a processing unit.

7. The tangible computer readable storage medium according to claim 1, wherein the confirming the identity of the connected fiber as being the intended fiber is performed by an optical transceiver.

8. The tangible computer readable storage medium according to claim 7, wherein an optical time-domain reflectometer is integrated into the optical transceiver.

9. The tangible computer readable storage medium according to claim 1, wherein the alert is one of an audible tone, a visual indication, and a notification to a user.

10. The tangible computer readable storage medium according to claim 1, wherein the alert is sent electronically to a network controller.

11. A system, comprising:
    a memory storing profiles of a plurality of fibers within a network, each profile including unique measurement data pertaining to one of the plurality of fibers;
    a detector collecting further measurement data from a connected fiber; and
    a comparator comparing the further measurement data to the unique measurement data of the profiles, the comparator confirming an identity of the connected fiber as one of the plurality of fiber when the further measurement data match unique measurement data of one of the profiles, and the comparator triggering an alert when the further measurement data does not match unique measurement data of any of the profiles.

12. The system according to claim 11, further comprising:
    a processing unit for performing initial measurements of a plurality of fibers in the network, the plurality of fibers including the intended fiber, creating a plurality of profiles for each of the plurality of fibers, each of the profiles including unique measurement data for each of the fibers, and storing the plurality of profiles in the memory.

13. The system according to claim 11, wherein the unique measurement data includes a relative backscatter reading of the intended fiber and the further measurement includes a relative backscatter reading of the connected fiber.

14. The system according to claim 11, wherein the detectors reside within an optical time-domain reflectometer and the collecting of the further measurement data is performed by the optical time-domain reflectometer.

15. The system according to claim 11, wherein the collecting of the further measurement data includes bi-directional traces along the length of the connected fiber.

16. The system according to claim 11, wherein the comparator is a processing unit.

17. The system according to claim 11, wherein the confirming the identity of the connected fiber as being the intended fiber is performed by an optical transceiver.

18. The system according to claim 17, wherein an optical time-domain reflectometer is integrated into the optical transceiver.

19. The system according to claim 11, wherein the alert is one of an audible tone, a visual indication, and a notification to a user.

20. The system according to claim 11, wherein the alert is sent electronically to a network controller.

* * * * *